United States Patent
Kim et al.

(10) Patent No.: US 8,404,900 B2
(45) Date of Patent: Mar. 26, 2013

(54) ABSORBENTS FOR SEPARATING ACIDIC GASES

(75) Inventors: Jun-Han Kim, Daejeon (KR); Jae-Goo Shim, Daejeon (KR); Kyung-Ryong Jang, Daejeon (KR); Ji-Hyun Lee, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 222 days.

(21) Appl. No.: 12/606,949

(22) Filed: Oct. 27, 2009

(65) Prior Publication Data

US 2010/0105551 A1    Apr. 29, 2010

(30) Foreign Application Priority Data

Oct. 28, 2008 (KR) .................. 10-2008-0106161

(51) Int. Cl.
- C07C 215/08 (2006.01)
- C07D 241/04 (2006.01)
- B01D 53/40 (2006.01)
- B01D 53/50 (2006.01)
- B01D 53/52 (2006.01)
- B01D 53/56 (2006.01)
- B01D 53/62 (2006.01)
- B01D 53/72 (2006.01)

(52) U.S. Cl. ........ 564/503; 564/511; 546/184; 544/358; 540/1; 423/210; 423/220; 423/226; 423/228; 423/235; 423/242.1; 423/242.2; 423/242.4; 423/242.7

(58) Field of Classification Search ............. 423/210, 423/220, 226, 228, 235, 242.1, 242.2, 242.4, 423/242.7; 532/3, 59, 63; 540/1; 544/358; 546/184; 564/503, 511
See application file for complete search history.

(56) References Cited

U.S. PATENT DOCUMENTS 5,700,437 A * 12/1997 Fujii et al. ............... 423/220
6,165,432 A    12/2000 Rooney

FOREIGN PATENT DOCUMENTS

| CA | 2 286 605 | 10/1999 |
| CA | 2 345 421 | 4/2000 |
| CA | 2 625 769 | 4/2007 |
| CA | 2651888 | * 11/2008 |
| CA | 2 697 944 | 3/2009 |
| EP | 0 588 178 | 3/1994 |
| EP | 1062998 | * 12/2000 |
| JP | 05-301024 | 11/1993 |
| KR | 0123107 B1 | 11/1997 |
| KR | 1020010073200 A | 7/2001 |
| KR | 1020050007477 | 1/2005 |
| WO | WO 2007/134994 | * 11/2007 |
| WO | WO 2010/134926 | * 11/2010 |

* cited by examiner

*Primary Examiner* — Daniel C McCracken
*Assistant Examiner* — Daniel Berns
(74) *Attorney, Agent, or Firm* — McDermott Will & Emery LLP

(57) ABSTRACT

An absorbent for separating acidic gases is disclosed. The absorbent or an absorbent composition for separating acidic gases has more than 3 kinds of compounds along with Chemical Formula 1 and 2, and has ability of rapid carbon dioxide elimination, excellent absorption ability, and less energy consumption for regenerating an absorbent due to easy desorption of carbon dioxide.

[Chemical Formula 1]

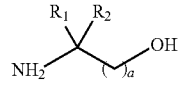

[Chemical Formula 2]

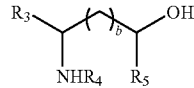

5 Claims, No Drawings

ABSORBENTS FOR SEPARATING ACIDIC GASES

BACKGROUND OF THE INVENTION

1. Field of the Invention

The present invention relates to an absorbent for separating acidic gases from a gas mixture, and more particularly, to a carbon dioxide separating absorbents having a high reaction rate with carbon dioxide, high absorption ability, and less energy consumption for regenerating the absorbents.

2. Description of the Related Art

Absorption, distillation, adsorption, membrane separation, and the like are contemporary applicable techniques for separating carbon dioxide from exhaust gas and factory flue gas. Absorption and distillation techniques among them are applicable to an exhaust gas source such that the concentration of a subject component is equal to or higher than 10% and a large quantity of flue gas is emitted, while adsorption and membrane separation techniques are applicable to an exhaust gas source such that the concentration of a subject component is low and a small quantity of flue gas is emitted.

Carbon dioxide separation process by absorption is a technique of selective separation of carbon dioxide by which flue gas containing carbon dioxide is brought into contact with various kinds of absorbents. This technique is classified into physisorption and chemisorption according to the characteristics of the absorbents. Specifically, absorption and separation techniques by using an alkanolamine absorbent solution has been widely used in chemical industries to eliminate acidic gases such as $CO_2$, $H_2S$, and COS.

Monoethanolamine (MEA) and diethanol amine (DEA) have been widely used because of high reaction rate, however, they have disadvantages such as high corrosiveness and heat deterioration. Further, N-methyl diethanolamine (MDEA) has low corrosiveness and regenerated heat and a low absorption rate.

Recently, studies about sterically hindered amines as a series of new alkanolamine absorbents are actively in progress. These sterically hindered amines have advantages of absorption capacity, selectivity of an acidic gas, and requiring less energy for regeneration but those alkanolamies have a disadvantage of low absorption rate.

Korean Unexamined Patent Application Publication No. 2005-0007477 discloses potassium taurate as an absorbent, however after the reaction with carbon dioxide precipitates to be removed are produced. Further, since potassium taurate has a lower carbon dioxide absorption rate than existing absorbents and is a less sterically hindered primary ammonium salt, more energy is required to separate carbon dioxide.

Japanese Patent No. 2,871,335 disclosed that a piperazine derivative is used as an accelerator for a secondary amine such as 2-amino-2-methyl-1-propanol (AMP) or (2-aminoethyl)ethanol which is a bulky amine bonded to a tertiary carbon.

BRIEF SUMMARY OF THE INVENTION

Therefore, the present invention has been made in view of the above problems, and the present invention provides an acidic gas separating absorbent having high reaction rate with carbon dioxide, excellent absorption ability, and less energy consumption for regenerating an absorbent due to easy desorption of carbon dioxide.

The above aspects and features of the present invention are achieved by providing an absorbent for separating acidic gases, comprising: compounds represented by the following Chemical Formula 1; compounds represented by the following Chemical formula 2; and a single compound or a mixture thereof selected from a group consisting of compounds represented by the following Chemical formulas 3 to 7.

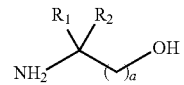
[Chemical Formula 1]

wherein, 'a' is an integer from 1 to 4,
$R_1$ is an alkyl group having a carbon number from 1 to 6, and
$R_2$ is methyl group.

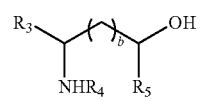
[Chemical Formula 2]

wherein, 'b' is an integer from 0 to 3,
$R_3$ is hydrogen or an alkyl group having a carbon number from 1 to 6,
$R_4$ is hydrogen or an alkyl group having a carbon number from 1 to 3,
$R_5$ is hydrogen or an alkyl group having a carbon number from 1 to 3,
$R_3$ and $R_5$ are not hydrogen at the same time, and
$R_3$, $R_4$ and $R_5$ are not hydrogen at the same time.

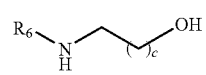
[Chemical Formula 3]

wherein, 'c' is an integer from 1 to 4 and
$R_6$ is an alkyl group having a carbon number from 1 to 4.

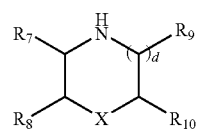
[Chemical Formula 4]

wherein, 'd' is an integer from 0 to 2,
$R_7$, $R_8$, $R_9$, and $R_{10}$, are hydrogen, alkyl groups having a carbon number from 1 to 4, —$(CH_2)_l$—OH (l=1 to 4) or $(CH_2)_m$—$NH_2$ (m=1 to 4), and
X is —$CH_2$, —O—, —NH or —S—.

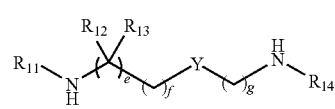
[Chemical Formula 5]

wherein, 'a' is an integer from 0 or 1
f and g are integers from 0 to 3, and
$R_{11}$ and $R_{14}$ are hydrogen, alkyl groups having a carbon number from 1 to 5, or —$(CH_2)_k$—$NH_2$ (k=0 to 5,
Y is —$CH_2$, —CHOH, —NH, —O—, or

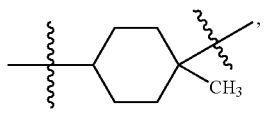

and $R_{12}$ and $R_{13}$ are hydrogen or methyl group.

[Chemical Formula 6]

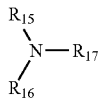

wherein, $R_{15}$, $R_{16}$, and $R_{17}$, are alkyl groups having a carbon number from 1 to 4, $-(CH_2)_l-OH$ ($l=1~4$) or $(CH_2)_m-NH_2$ ($m=1~4$).

[Chemical Formula 7]

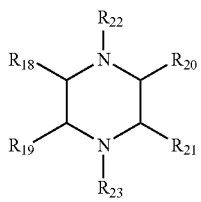

wherein, $R_{18}$, $R_{19}$, $R_{20}$ and $R_{21}$ are hydrogen, alkyl groups having a carbon number from 1 to 4, $-(CH_2)_l-OH$ ($l=1$ to ~4) or $(CH_2)_m-NH_2$ ($m=1$ to 4), and $R_{22}$ and $R_{23}$ are alkyl groups having a carbon number from 1 to 3, $-(CH_2)_l-OH$ ($l=1$ to 3) or $(CH_2)_m-NH_2$ ($m=1$ to 3).

The compound represented by Chemical Formula 2 with respect to 100 parts by weight of the compound represented by Chemical Formula 1 may be in an amount of 50 to 100 parts by weight.

The compound represented by Chemical Formula 3 with respect to 100 parts by weight of the compound represented by Chemical Formula 1 may be in an amount of 10 to 60 parts by weight.

The compound represented by Chemical Formula 4 or 5 with respect to 100 parts by weight of the compound represented by Chemical Formula 1 may be in an amount of 5 to 60 parts by weight.

The compound represented by Chemical Formula 6 or 7 with respect to 100 parts by weight of the compound represented by Chemical Formula 1 may be in an amount of 50 to 200 parts by weight.

To accomplish the object of the present invention, the present invention provides an absorbent containing a compound represented by Chemical Formula 1 or 2; and more than 2 kinds of compounds selected from a group consisting of a compound represented by Chemical Formulas 3 to 7.

To accomplish the aspects and features of the present invention, the present invention also provides an absorbent containing a compound represented by Chemical Formula 3; and more than two kinds of compounds selected from the group consisting of compounds represented by Chemical Formulas 4 to 7.

The absorbents according to the present invention have a fast reaction rate with carbon dioxide and high absorption ability. Since desorption of carbon dioxide is easily carried out, less energy consumption for separating carbon dioxide is required and the process becomes more economical.

The absorbents according to the present invention have a merit of reduced operation costs and industrialization because of less evaporation due to a higher boiling point, high resistance to oxidation and heat deterioration, and reduced corrosiveness.

DETAILED DESCRIPTION OF THE INVENTION

Hereinafter, embodiments of the present invention will be described in detail.

An absorbent according to an embodiment of the present invention for separating acidic gases includes a compounds represented by Chemical Formula 1; a compounds represented by Chemical Formula 2; and a single compound or a mixture of compounds selected from a group consisting of compounds represented by Chemical Formulas 3 to 7,

[Chemical Formula 1]

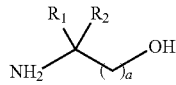

wherein, 'n' is an integer from 1 to 4, $R_1$ is an alkyl group having a carbon number from 1 to 6, and $R_2$ is methyl group.

[Chemical Formula 2]

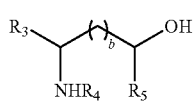

where, 'b' is an integer from 0 to 3, $R_3$ is an alkyl group having a carbon number from 1 to 6,
$R_4$ is an alkyl group having a carbon number from 1 to 3,
$R_5$ is an alkyl group having a carbon number from 1 to 3,
$R_3$ and $R_5$ are not hydrogen at the same time, and
$R_3$, $R_4$ and $R_5$ are not hydrogen at the same time.

[Chemical Formula 3]

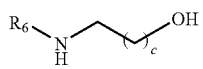

wherein, 'c' is an integer from 1 to 4 and
$R_6$ is an alkyl group having a carbon number from 1 to 4.

[Chemical Formula 4]

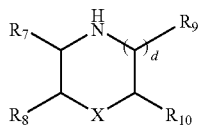

where, 'd' is an integer from 0 to 2, $R_7$, $R_8$, $R_9$, and $R_{10}$, are alkyl groups having a carbon number from 1 to 4, $-(CH_2)_l-OH$ ($l=1$ to 4) or $(CH_2)_m-NH_2$ ($m=1$ to 4), and X is $-CH_2-$, $-O-$, $-NH$ or $-S-$.

[Chemical Formula 5]

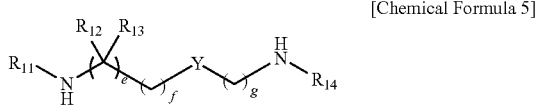

wherein, 'e' is an integer from 0 or 1,
f and g are integers from 0 to 3, and
$R_{11}$ and $R_{14}$ are hydrogen, alkyl groups having a carbon number from 1 to 5, or —$(CH_2)_k$—$NH_2$ (k=0 to 5,
Y is —$CH_2$, —CHOH, —NH, —O—, or

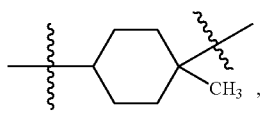

and
$R_{12}$ and $R_{13}$ are hydrogen or methyl groups.

[Chemical Formula 6]

wherein, $R_{15}$, $R_{16}$ and $R_{17}$ are alkyl groups having a carbon number from 1 to 4, —$(CH_2)_l$—OH (l=1 to 4) or $(CH_2)_m$—$NH_2$ (m=1 to 4).

[Chemical Formula 7]

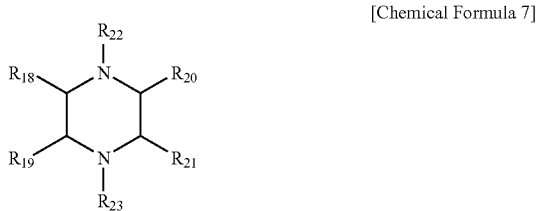

wherein, $R_{18}$, $R_{19}$, $R_{20}$ and $R_{21}$ are alkyl groups having a carbon number from 1 to 4, —$(CH_2)_l$—OH (l=1 to 4) or $(CH_2)_m$—$NH_2$ (m=1 to 4), and
$R_{22}$ and $R_{23}$ are alkyl groups having a carbon number from 1 to 3, —$(CH_2)_l$—OH (l=1 to 3) or $(CH_2)_m$—$NH_2$ (m=1 to 3).

The absorbent for separating acidic gases is a blended absorbent which contains more than 3 kinds of components, has a high reaction rate to eliminate carbon dioxide, excellent absorption ability, and less energy consumption for regenerating absorbents because of easy desorption of carbon dioxide.

The compound represented by Chemical Formula 1 containing an alcoholic hydroxyl group and an amine group in the molecule is a sterically hindered amine in which a tertiary carbon is bonded to an amino group. The compound has characteristics of excellent desorption of carbon dioxide and low energy consumption compared to existing amine absorbents. The disadvantage of low reaction rate with carbon dioxide can be overcome by adding compounds represented by Chemical Formulas 2 and 3 to 7 so that carbon dioxide absorption ability of the blended absorbents is further enhanced.

There are specific examples of compounds represented by Chemical Formula 1 such as 2-amino-2-methyl-1-propanol, 2-amino-2-methyl-1-butanol, 2-amino-2-methyl-1-pentanol, 3-amino-3-methyl-1-butanol, and 4-amino-4-methyl-1-pentanol. Preferably, 2-Amino-2-methyl-1-propanol is used.

The compound represented by Chemical Formula 2 is less sterically hindered than the compound represented by Chemical Formula 1 and is more reactive toward carbon dioxide due to increased electronegativity due to repulsion between unpaired electrons of nitrogen and an alkyl group bonded to the amine. Accordingly, when the compound represented by Chemical Formula 2 is used with the compound represented by Chemical Formula 1 reactivity toward carbon dioxide increases.

The compound represented by Chemical Formula 2 with respect to 100 parts by weight of the compound represented by Chemical Formula 1 may be in an amount of 50 to 100 parts by weight. When the amount of the compound represented by Chemical Formula 2 is less than 50 parts by weight, increase of reaction rate with carbon dioxide is insignificant. When the amount of the compound represented by Chemical Formula 2 is more than 100 parts by weight, expected increase of reaction rate with carbon dioxide is insignificant and thus not economical.

There are specific examples of compounds represented by Chemical Formula 2 such as N-methyl-2-amino-1-propanol, N-ethyl-2-amino-1-propanol, N-isopropyl-2-amino-1-propanol, N-methyl-2-amino-1-butanol, N-methyl-2-amino-1-pentanol, N-isopropyl-2-amino-1-pentanol, 2-amino-1-propanol, 2-amino-1-butanol, 2-amino-3-methyl-1-butanol, 3-amino-2-methyl-1-butanol, 2-amino-1-pentanol, 2-amino-1-hexanol, 3-amino-1-butanol, 4-amino-1-pentanol, 5-amino-1-hexanol, 3-amino-1-pentanol, 3-amino-1-hexanol, 1-amino-2-propanol, 1-amino-2-butanol, 1-amino-2-pentanol, and 1-amino-3-methyl-2-butanol. Preferably, 2-Amino-1-butanol or 1-amino-2-propanol is used.

The compound represented by Chemical Formula 3 has a less sterically hindered structure than the compounds represented by Chemical Formulas 1 and 2 so that a fast reaction with carbon dioxide increases elimination rate of carbon dioxide.

Furthermore, where a carbamate is formed by the reaction between carbon dioxide and an amine, the bond strength between N and C is weakened by steric repulsion between C and an alkyl bonded to the amine, so that desorption of carbon dioxide is easily carried out during regeneration of an absorbent and less energy consumption is required.

The compound represented by Chemical Formula 3 with respect to 100 parts by weight of the compound represented by Chemical Formula 1 may be in an amount of 10 to 60 parts by weight. Where the amount of the compound represented by Chemical Formula 3 is less than 10 parts by weight, the purposes such as easy desorption of carbon dioxide and increase of reaction rate are not attainable. Where the amount of the compound represented by Chemical Formula 3 is more than 60 parts by weight, an expected increased effect is insignificant and thus not economical.

There are specific examples of compounds represented by Chemical Formula 3 such as 2-(methylamino)ethanol, 2-(ethylamino)ethanol, 2-(propylamino)ethanol, 2-(isopropylamino)ethanol, 2-(butylamino)ethanol, 2-(tert-butylamino)ethanol, 3-(methylamino)propanol, 3-(ethylamino)propanol, 3-(propylamino)propanol, 3-(isopropylamino)propanol, 3-(butylamino)propanol, 3-(tert-butylamino)propanol, 4-(methylamino)butanol, 4-(ethylamino)butanol, 4-(propylamino)butanol, 4-(isopropylamino)butanol, 4-(butylamino)butanol, 4-(tert-butylamino)butanol, 5-(methylamino)pentanol, 5-(ethylamino)pentanol, 5-(propylamino)pentanol, 5-(isopropylamino)pentanol, 5-(butylamino)pentanol, and 5-(tert-butylamino)pentanol. Preferably, 2-(Butylamino)ethanol, 2-(isopropylamino)ethanol, or 2-(tert-butylamino)ethanol is used.

Since the compounds represented by Chemical Formula 4 or 5 have a fast carbon dioxide absorption rate, a carbon dioxide elimination rate can be enhanced by addition of the compounds.

Where the group X or Y in the compound represented by Chemical Formula 4 or 5 is —NH, the amount of amine to react with carbon dioxide is doubled so that carbon dioxide absorption rate can be increased.

The compound represented by Chemical Formula 4 or 5 with respect to 100 parts by weight of the compound represented by Chemical Formula 1 may be in an amount of 5 to 60 parts by weight, preferably 5 to 30 parts by weight. Where the amount of the compound represented by Chemical Formula 4 or 5 is less than 5 parts by weight, the purposes of achieving easy desorption of carbon dioxide and of increasing reaction rate are not achieved. Where the amount of the compound represented by Chemical Formula 4 or 5 is more than 60 parts by weight, an expected effect of increase is insignificant and thus not economical.

There are specific examples of compounds represented by Chemical Formula 4 such as piperazine, morpholine, 2-methylpiperazine, 2,5-dimethylpiperazine, 2,3-dimethylpiperazine, 2,4-dimethylpiperazine, 2-ethanolpiperazine, 2,5-diethanolpiperazine, 2-aminoethylpiperazine, thiomorpholine, piperidine, azepane, azepine, azocane, piperazine containing azocine, and derivatives of morpholine, thiomorpholine, piperidine, azepane, azepine, azocane, and azocine. Preferably, piperazine is used.

There are specific examples of compounds represented by Chemical Formula 5 such as N,N-dimethyl-1,3-propanediamine, diethylenetriamine, 1,3-diamino-2-propanol, 1,5-diamino-3-pentanol, butylenediamine, pentamethylenediamine, hexamethylenediamine, bis(3-aminopropyl)amine, tetraethylenepentamine, N-isopropylethylenediamine, N-isopropyl-1,3-propanediamine, and 1,8-diamino-para-menthane. Preferably, N,N-dimethyl-1,3-propanediamine is used.

The compound represented by Chemical Formula 6 or 7 is a tertiary alkanolamine which has larger carbon dioxide absorption capacity compared to primary and secondary alkanolamines. Correspondingly, when the compound represented by Chemical Formula 6 or 7 is added, carbon dioxide absorption ability of an absorbent can be improved.

Generally, the carbon dioxide absorption reaction of alkanolamine, which is widely used for absorption of carbon dioxide, is explained simply by mechanisms of an acid-base neutralization reaction and a catalytic hydrolysis of carbon dioxide. Formation of carbamates is main reaction in a reaction of a primary and secondary alkanolamine with carbon dioxide, and catalytic hydrolysis of carbon dioxide is the main reaction in a reaction of tertiary alkanolamine and a sterically hindered amine with carbon dioxide. The following chemical equation 1 exhibits an absorption reaction mechanism of a primary and a secondary amine with carbon dioxide, and the following chemical equation 2 exhibits a reaction mechanism of a tertiary alkanolamine or sterically hindered amine with carbon dioxide.

$$2RNH_2 + CO_2 \rightarrow RNHCOO^- + RNH_3^+$$

$$RNHCOO^- + H_2O \rightarrow RNH_2 + HCO_3^-$$ [Chemical Equation 1]

$$R_3N + CO_2 + H_2O \rightarrow R_3NH^+ + HCO_3^-$$ [Chemical Equation 2]

According to the Chemical Equation 1, a primary alkanolamine reacts with carbon dioxide to produce carbamate and then the carbamate is hydrolyzed to give bicarbonate.

According to the Chemical Equation 2, a tertiary alkanolamine and a sterically hindered amine react with carbon dioxide where the formation of carbamate and the hydrolysis are occurred simultaneously so that the carbamate is seemed not to produce. Since, the structure of the carbamate in this reaction is very unstable due to steric hindrance, hydrolysis is very easy to occur. Resultantly, carbamate is formed and then subsequent hydrolysis of carbamate takes place so that carbamate cannot be a product. Theoretically, two moles of primary or secondary amine is required to react with one mole of carbon dioxide while tertiary amine or a sterically hindered amine reacts with one equivalent weight of carbon dioxide. Therefore, tertiary amine or a sterically hindered amine may have two times the absorption capacity of carbon dioxide compared to a primary or a secondary amine.

The compound represented by Chemical Formula 6 or 7 with respect to 100 parts by weight of the compound represented by Chemical Formula 1 may be in an amount of 50 to 200 parts by weight. Where the amount of the compound represented by Chemical Formula 6 or 7 is less than 50 parts by weight, the purposes such as enhancement of carbon dioxide absorption ability and increase of reaction rate are not attainable. Where the amount of the compound represented by Chemical Formula 6 or 7 is more than 200 parts by weight, expected increased absorption ability of carbon dioxide is insignificant and thus not economical.

There are specific examples of compounds represented by Chemical Formula 6 such as trimethanolamine, triethanolamine, tripropanolamine, tributanolamine, tripentanolamine, N-methyldimethanolamine, N-methyldiethanolamine, N-methyldipropanolamine, N-methyldibutanolamine, N-methyldipentanolamine, N-ethyldimethanolamine, N-ethyldiethanolamine, N-ethyldipropanolamine, N-ethyldibutanolamine, N-ethyldipentanolamine, N-propyldimethanolamine, N-propyldiethanolamine, N-propyldipropanolamine, N-propyldibutanolamine, N-propyldipentanolamine, 1-(dimethylamino)methanol, 2-(dimethylamino)ethanol, 3-(dimethylamino)propanol, 4-(dimethylamino)butanol, 5-(dimethylamino)pentanol, 1-(diethylamino)methanol, 2-(diethylamino)ethanol, 3-(diethylamino)propanol, 4-(diethylamino)butanol, 5-(diethylamino)pentanol, 1-(dipropylamino)methanol, 2-(dipropylamino)ethanol, 3-(dipropylamino)propanol, 4-(dipropylamino)butanol, 5-(dipropylamino)pentanol, N-isopropyl-diethnolamine, and N,N-dimethyl-1,3-propanediamine. Preferably, N-methyl diethanolamine is used.

There are specific examples of compounds represented by Chemical Formula 7 such as 1,4-dimethylpiperazine, 1,4-diethylpiperazine, 1,4-dipropylpiperazine, 1,4-diisopropylpiperazine, 1-(1-hydroxymethyl)-piperazine, 1-(2-hydroxyethyl)-piperazine, 1-(3-hydroxypropyl)-piperazine, 1,4-bis(1-aminomethyl)piperazine, 1,4-bis(2-aminoethyl)piperazine, and 1,4-bis(3-aminopropyl)piperazine. Preferably, 1,4-Dimethylpiperazine is used.

The absorbent for separating acidic gases includes compounds represented by Chemical Formula 1 or 2 and more than two kinds of compounds selected from the group consisting of compounds represented by Chemical Formulas 3 to 7.

The absorbent composition for separating acidic gases which contains more than 3 kinds of components, by synergism of each compound, has increased abilities of rapid carbon dioxide elimination and carbon dioxide absorption, and less energy consumption for regeneration of absorbent because desorption of carbon dioxide is easy.

The compound represented by Chemical Formula 3 with respect to 100 parts by weight of the compound represented by Chemical Formula 1 or 2 is in an amount of 10 to 60 parts by weight.

The compound represented by Chemical Formula 4 or 5 with respect to 100 parts by weight of the compound represented by Chemical Formula 1 or 2 may be in an amount of 5 to 60 parts by weight. The preferable amount is 5 to 30 parts by weight.

The compound represented by Chemical Formula 6 or 7 with respect to 100 parts by weight of the compound represented by Chemical Formula 1 or 2 may be in an amount of 50 to 200 parts by weight. The critical meanings about the amount and effects of the Chemical Formulas 1 to 7 are the same as described above, therefore description about the critical meanings is omitted.

An absorbent composition for separating acidic gases includes compounds represented by Chemical Formula 3 and more than two kinds of compounds selected from the group consisting of compounds represented by Chemical Formulas 4 to 7.

The absorbent composition which contains more than 3 kinds of absorbents, by synergism of each absorbent, has increased abilities of rapid carbon dioxide elimination and carbon dioxide absorption, and less energy consumption for regeneration of absorbent because desorption of carbon dioxide is easy.

The compound represented by Chemical Formula 4 or 5 with respect to 100 parts by weight of the compound represented by Chemical Formula 3 may be in an amount of 5 to 60 parts by weight. The preferable amount is 5 to 30 parts by weight.

The compound represented by Chemical Formula 6 or 7 with respect to 100 parts by weight of the compound represented by Chemical Formula 3 may be in an amount of 50 to 200 parts by weight. When the critical meanings of amount and effects of the Chemical Formulas 3 to 7 are the same as described above, descriptions about the critical meanings are omitted.

An aqueous solution in the concentration range from 5 to 50% (w/v) is preferable to use as an absorbent for separating acidic gases. Where the concentration is less than 5%, an ability of absorbing acidic gases such as carbon dioxide is maintained but absorption rate is low, so that the absorbed amount of carbon dioxide becomes low. Where the concentration is more than 50%, absorption ability and rate are excellent. However, a large mount of absorbents are required so that it is not economical.

The absorbent according to the embodiments of the present invention can be applied to not only carbon dioxide but also various kinds of acidic gases such as $H_2S$, $SO_2$, $NO_2$, COS, and the like.

Hereinafter, the absorbent according to the present invention will be described in detail with reference to the embodiments and comparative examples. However, the embodiments and comparative examples of the present invention are described only for the purpose of illustrating the present invention and the present invention is not limited thereto.

Embodiments 1 to 20

Preparation of Absorbents

Aqueous blends of absorbents are prepared to have composition and concentration as listed in the following Table 1. The unit in the following Table 1 is grams (g).

TABLE 1

| | 2-amino-2-methyl-1-propanol | 2-amino-1-butanol | 2-(butylamino)ethanol | piperazine | N,N-dimethyl-1,3-Propane diamine | N-methyl diethanol amine | 1,4-dimethyl piperazine | Concentration (M) |
|---|---|---|---|---|---|---|---|---|
| Embodiment 1 | 100 | 100 | | 18.5 | | | | 1.97 |
| Embodiment 2 | 100 | 100 | | 25 | | | | 2.03 |
| Embodiment 3 | 100 | 100 | | 12.5 | | | | 1.91 |
| Embodiment 4 | 100 | 100 | 37.5 | 25 | | | | 2.26 |
| Embodiment 5 | 100 | 66.5 | 25 | 15 | | | | 2.65 |
| Embodiment 6 | 100 | | 25 | 16.5 | | | | 1.81 |
| Embodiment 7 | 100 | | 50 | 16.5 | | | | 2.06 |
| Embodiment 8 | 100 | | 50 | 16.5 | | | 83.5 | 2.91 |
| Embodiment 9 | 100 | 50 | 25 | 12.5 | | | | 2.42 |
| Embodiment 10 | 100 | 66.5 | 25 | 12.5 | | | | 2.65 |
| Embodiment 11 | 100 | 66.5 | | 16.5 | | | | 2.45 |
| Embodiment 12 | 100 | 25 | | 12.5 | | | | 2.45 |
| Embodiment 13 | | 100 | | 20 | | 100 | | 2.15 |
| Embodiment 14 | | 100 | | 15 | | 150 | | 2.50 |
| Embodiment 15 | | 100 | 30 | | | 100 | | 2.17 |
| Embodiment 16 | 100 | | 28.5 | | 28.5 | | | 2.28 |
| Embodiment 17 | | | 100 | | | 30 | 50 | 2.31 |
| Embodiment 18 | | | 100 | 13.5 | | 46.5 | | 2.08 |
| Embodiment 19 | 100 | 50 | 20 | | | 200 | | 2.45 |
| Embodiment 20 | 100 | | 30 | | | 50 | | 2.45 |

Comparative Example 1

A 2.45 M of aqueous solution of monoethanolamine (MEA) which has the fastest carbon dioxide absorption rate and is commercially used as a carbon dioxide absorbent was prepared.

Comparative Example 2

A 2.45 M of aqueous solution of 2-amino-1-butanol as represented by Chemical Formula 2 was prepared.

Comparative Example 3

A 2.45M of aqueous solution containing 100 parts by weight of 2-amino-1-butanol represented by Chemical Formula 2 and 15 parts by weight of piperazine represented by Chemical Formula 4 was prepared.

Comparative Example 4

A 2.45M of aqueous solution containing 100 parts by weight of 2-amino-1-butanol represented by Chemical Formula 2 and 30 parts by weight of 2-(butylamino)ethanol represented by Chemical Formula 3 was prepared.

Experiment

A glass reactor was placed in an isothermal water bath maintained at 40 degrees Celsius, and then absorbents prepared in the above embodiments and comparative examples were put into the glass reactor. A mixture of gas containing 15% of carbon dioxide and 85% of nitrogen was introduced into the glass reactor through a glass tube at a rate of 3 L/min. Concentration of carbon dioxide contained in outlet gases was continuously monitored by an infrared carbon dioxide concentration monitor for measuring carbon dioxide absorption rate and total loading weight of carbon dioxide.

When the absorbent was saturated with carbon dioxide at a predetermined time (about 90 minutes) the reactor was moved to an isothermal water bath maintained at 80 degrees Celsius and then an amount of desorbed carbon dioxide and desorption rate were measured for 30 minutes. The results are listed in the following Table 2.

TABLE 2

| | Loading weight of carbon dioxide ($CO_2$ mole/absorbent mole) | | | | Carbon dioxide Absorption rate | Carbon dioxide Desorption rate |
| --- | --- | --- | --- | --- | --- | --- |
| | 40° C. Absorption | 80° C. Desorption | Loading weight difference | Desorption percent (%) | (g-$CO_2$/L absorbent * min) Initial 10 minutes | (g-$CO_2$/L absorbent * min) Initial 10 minutes |
| Embodiment 1 | 0.76 | 0.23 | 0.53 | 75 | 2.64 | 2.36 |
| Embodiment 2 | 0.78 | 0.23 | 0.55 | 75 | 3.02 | 2.66 |
| Embodiment 3 | 0.77 | 0.22 | 0.55 | 76 | 2.78 | 2.43 |
| Embodiment 4 | 0.78 | 0.25 | 0.53 | 68 | 3.17 | 2.92 |
| Embodiment 5 | 0.75 | 0.25 | 0.50 | 70 | 3.09 | 2.85 |
| Embodiment 6 | 0.94 | 0.29 | 0.65 | 71 | 3.20 | 2.81 |
| Embodiment 7 | 0.91 | 0.25 | 0.66 | 72 | 3.24 | 3.22 |
| Embodiment 8 | 0.63 | 0.12 | 0.51 | 80 | 2.64 | 3.03 |
| Embodiment 9 | 0.74 | 0.22 | 0.52 | 71 | 2.84 | 2.70 |
| Embodiment 10 | 0.73 | 0.22 | 0.51 | 69 | 3.00 | 2.94 |
| Embodiment 11 | 0.75 | 0.24 | 0.51 | 68 | 2.98 | 2.89 |
| Embodiment 12 | 0.76 | 0.21 | 0.55 | 73 | 2.91 | 3.01 |
| Embodiment 13 | 0.69 | 0.15 | 0.54 | 78 | 2.77 | 2.70 |
| Embodiment 14 | 0.63 | 0.14 | 0.49 | 77 | 2.63 | 2.87 |
| Embodiment 15 | 0.64 | 0.13 | 0.51 | 80 | 2.52 | 2.52 |
| Embodiment 16 | 0.89 | 0.32 | 0.57 | 64 | 3.03 | 2.70 |
| Embodiment 17 | 0.58 | 0.06 | 0.52 | 89 | 2.38 | 2.51 |
| Embodiment 18 | 0.69 | 0.12 | 0.57 | 83 | 2.80 | 2.74 |
| Embodiment 19 | 0.63 | 0.10 | 0.53 | 85 | 2.37 | 2.70 |
| Embodiment 20 | 0.71 | 0.09 | 0.62 | 87 | 2.60 | 3.11 |
| Comparative example 1 | 0.65 | 0.32 | 0.33 | 50 | 3.03 | 1.86 |
| Comparative example 2 | 0.63 | 0.20 | 0.43 | 68 | 2.82 | 2.49 |
| Comparative example 3 | 0.68 | 0.23 | 0.45 | 66 | 3.08 | 2.60 |
| Comparative example 4 | 0.70 | 0.27 | 0.43 | 61 | 3.12 | 2.44 |

As listed in Table 2, the absorbents according to the embodiments exhibit better absorption ability than the absorbents of the comparative examples based on loading weight differences and desorption ratios. Desorption and absorption rates of the absorbents in the embodiments in the initial 10 minutes are similar to or better than those of the absorbents of the comparative examples.

Comparative examples 1 and 4 exhibit fast carbon dioxide absorption but poor desorption rates and percents. Further, comparative examples 2 and 3 exhibit poor desorption rates and ratios in comparison to the embodiments. Embodiment 1 exhibits somewhat less absorption and desorption rates than the comparative examples but exhibits good desorption ratio. Embodiments 5 to 9 exhibit fast absorption and desorption rates and superior desorption ratios for the initial 10 minutes. Absorption and desorption rates in the embodiments 15 and 17 to 20 are similar to or somewhat slower than those in the comparative examples, but desorption ratios of the embodiments are much more superior to those of the comparative examples.

As described above, the blended absorbents of the present invention for separating acidic gases have excellent absorption abilities and fast carbon dioxide absorption rates which are similar to or better than a single absorbent or MEA known as an absorbent having a fast carbon dioxide absorption rate. Further, a desorption rate of the blended absorbents of the present invention is so fast that less energy consumption for regenerating absorbents is required.

What is claimed is:

1. An absorbent for separating acidic gases comprising:
a compound represented by the Chemical Formula 2; and
more than two kinds of compounds selected from the group consisting of compounds represented by the Chemical Formulas 3 to 7,

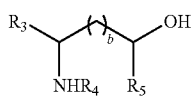

[Chemical Formula 2]

wherein, 'b' is an integer from 0 to 3,
$R_3$ is hydrogen or an alkyl group having a carbon number from 1 to 6,
$R_4$ is hydrogen or an alkyl group having a carbon number from 1 to 3,
$R_5$ is hydrogen or an alkyl group having a carbon number from 1 to 3,
$R_3$ and $R_5$ are not hydrogen at the same time, and
$R_3$, $R_4$ and $R_5$ are not hydrogen at the same time,

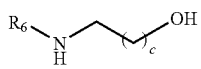

[Chemical Formula 3]

where, 'c' is an integer from 1 to 4 and
$R_6$ is an alkyl group having a carbon number from 1 to 4,

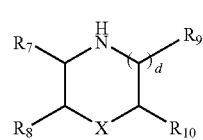

[Chemical Formula 4]

wherein, is an integer from 0 to 2,
$R_7$, $R_8$, $R_9$, and $R_{10}$, are hydrogen, alkyl groups having a carbon number from 1 to 4, —$(CH_2)_l$—OH (l=1 to 4) or $(CH_2)_m$—$NH_2$ (m=1 to 4), and
X is —$CH_2$, —O—, —NH or —S—,

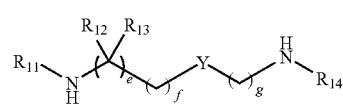

[Chemical Formula 5]

wherein, 'e' is an integer from 0 or 1
f and g are integers from 0 to 3, and
$R_{11}$ and $R_{14}$ are hydrogen, alkyl groups having a carbon number from 1 to 5, or —$(CH_2)_k$—$NH_2$ (k=0 to 5),
Y is —$CH_2$, —CHOH, —NH, —O—, or

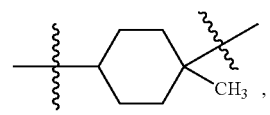

and
$R_{12}$ and $R_{13}$ are hydrogen or methyl groups,

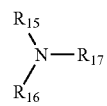

[Chemical Formula 6]

wherein, $R_{15}$, $R_{16}$, and $R_{17}$, are alkyl groups having a carbon number from 1 to 4, —$(CH_2)_l$—OH (l=1~4) or $(CH_2)_m$—$NH_2$ (m=1 to 4),

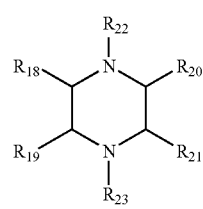

[Chemical Formula 7]

wherein, $R_{18}$, $R_{19}$, $R_{20}$ and $R_{21}$ are hydrogen, alkyl groups having a carbon number from 1 to 4, —$(CH_2)_l$—OH (l=1 to 4) or $(CH_2)_m$—$NH_2$ (m=1 to 4), and
$R_{22}$ and $R_{23}$ are alkyl groups having a carbon number from 1 to 3, —$(CH_2)_l$—OH (l=1 to 3) or $(CH_2)_m$—$NH_2$ (m=1 to 3),
wherein the ratio of the compound represented by the Chemical Formula 3 to the compound represented by the Chemical Formula 2 is 10 to 60 parts by weight to 100 parts by weight, respectively.

2. The absorbent of claim 1, wherein the ratio of the compound represented by the Chemical Formula 4 or 5 to the compound represented by the Chemical Formula 2 is 5 to 60 parts by weight to 100 parts by weight, respectively.

3. The absorbent of claim 1, wherein the ratio of the compound represented by the Chemical Formula 6 or 7 to the compound represented by the Chemical Formula 2 is 50 to 200 parts by weight to 100 parts by weight, respectively.

4. The absorbent of claim 1, wherein the concentration of the absorbents in an aqueous solution is in the range of 5 to 50% (w/v).

5. The absorbent of claim 1, wherein the acidic gas is one of a single compound and a mixture of compounds selected from the group consisting of $CO_2$, $H_2S$, $SO_2$, $NO_2$, and COS.

* * * * *